(12) United States Patent
Pype (10) Patent No.: US 8,229,898 B1
(45) Date of Patent: Jul. 24, 2012

(54) METHODS AND SYSTEMS FOR UTILIZING REDUNDANT DATA

(75) Inventor: Hans Pype, Nazareth (BE)

(73) Assignee: Symantec Corporation, Mountain View, CA (US)

( * ) Notice: Subject to any disclaimer, the term of this patent is extended or adjusted under 35 U.S.C. 154(b) by 374 days.

(21) Appl. No.: 12/415,249

(22) Filed: Mar. 31, 2009

(51) Int. Cl.
*G06F 17/30* (2006.01)

(52) U.S. Cl. ........................................................ 707/686

(58) Field of Classification Search .................... 707/686
See application file for complete search history.

(56) References Cited

U.S. PATENT DOCUMENTS

| | | | | |
|---|---|---|---|---|
| 5,832,514 | A | * | 11/1998 | Norin et al. ............ 707/999.202 |
| 2005/0262168 | A1 | * | 11/2005 | Helliker et al. ................ 707/204 |
| 2006/0136903 | A1 | * | 6/2006 | Childress et al. ............. 717/172 |
| 2008/0244204 | A1 | * | 10/2008 | Cremelie et al. ............. 711/162 |
| 2009/0077140 | A1 | * | 3/2009 | Anglin et al. .................. 707/204 |
| 2010/0070478 | A1 | * | 3/2010 | Anglin .......................... 707/674 |

OTHER PUBLICATIONS

Norton Ghost User's Guide, PN: 10024709, Copyright 1998-2002 Symantec Corporation, pp. 1-43.*
Peter Elliman & Stefaan Vervaet, White Paper: "Global Data Deduplication Results with NetBackup PureDisk", Nov. 2007, pp. 1-15.*

* cited by examiner

*Primary Examiner* — Cheryl Lewis
*Assistant Examiner* — Scott A Waldron
(74) *Attorney, Agent, or Firm* — Advantedge Law Group (57) ABSTRACT

A computer-implemented method, at least a portion of the method being performed by a backup computing system configured to backup data from first and second protected systems, may include receiving a request to restore data of the first protected system. The computer-implemented method may also include determining that at least a first portion of the data to be restored is located on the second protected system. The computer-implemented method may further include instructing the second protected system to send at least the first portion of the data to a recovery system. Another computer-implemented method may include receiving a request to create a clone of a first computing system, determining that data to be cloned is located on a second computing system, and instructing the second computing system to send the data to the clone. Various other methods, systems, and computer-readable media are also disclosed.

20 Claims, 8 Drawing Sheets

METHODS AND SYSTEMS FOR UTILIZING REDUNDANT DATA

BACKGROUND

As enterprises increasingly rely on and store large amounts of data in their day-to-day operating, data recovery has become increasingly important. Downtime of one or more systems may result in significant losses in productivity and/or significant financial losses. Thus, the true cost of a system failure may be proportional with the downtime. Accordingly, timely restoration of lost or corrupted data may be critical for many enterprises.

Traditional backup solutions may store backed-up data in one location, and possibly on a single device. Restoration efficiency may be limited by the performance of the device that stores the backed-up data. For example, a recovery point may have a relatively slow connection with a backup device, which may result in a substantial amount of downtime. Such scenarios are common because many backup devices are, by design, at locations remote from the devices they protect. What is needed, therefore, is a data recovery solution that provides rapid and reliable recovery of protected devices.

SUMMARY

Embodiments of the instant disclosure provide methods and systems for utilizing redundant data. For example, some embodiments may restore data by accessing redundant data from other protected endpoints in addition to and/or instead of retrieving the data from a central repository. For example, a data-restoration module may receive a request to restore data of a first protected system. The data-restoration module may determine that at least a first portion of the data to be restored is located on a second protected system. After locating the first portion of the data on the second protected system, the data-restoration module may instruct the second protected system to send at least the first portion of the data to a recovery system. In some embodiments, the recovery system may comprise the first protected system (e.g., the data may be restored to the protected system that failed). In other embodiments, the data of the first protected system may be restored to a different system.

In some embodiments, the data-restoration module may determine that the first portion of the data to be restored is located on multiple protected systems. The data-restoration module may determine which of the protected systems has a faster connection with the recovery system and may use the system with the faster connection to send the data to be restored to the recovery system.

In some embodiments, a cloning module may receive a request to create a clone of a first computing system, determine that at least a first portion of data to be cloned is located on a second computing system, and instruct the second computing system to send at least the first portion of the data to the clone. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
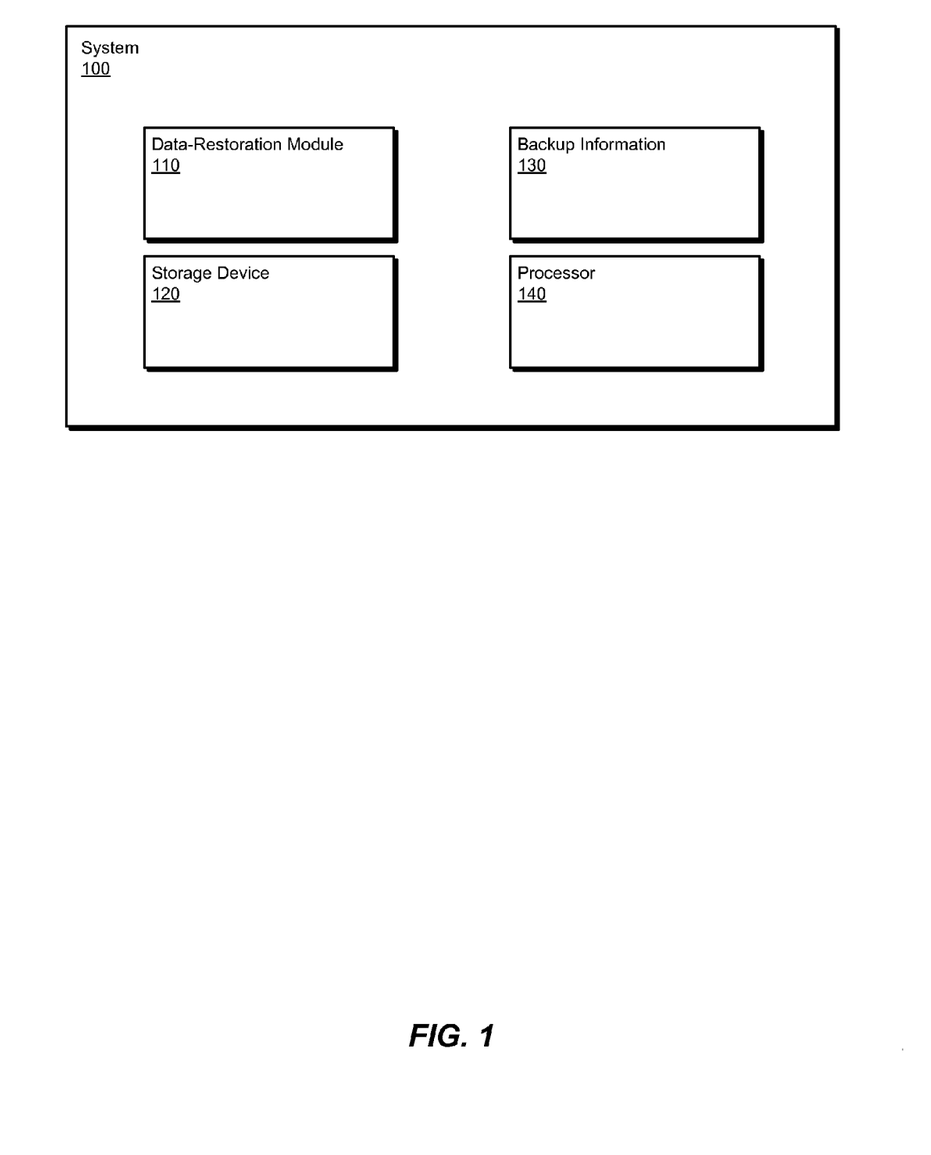
FIG. 1 is a block diagram of an exemplary system for restoring data according to certain embodiments.
Figure 2:
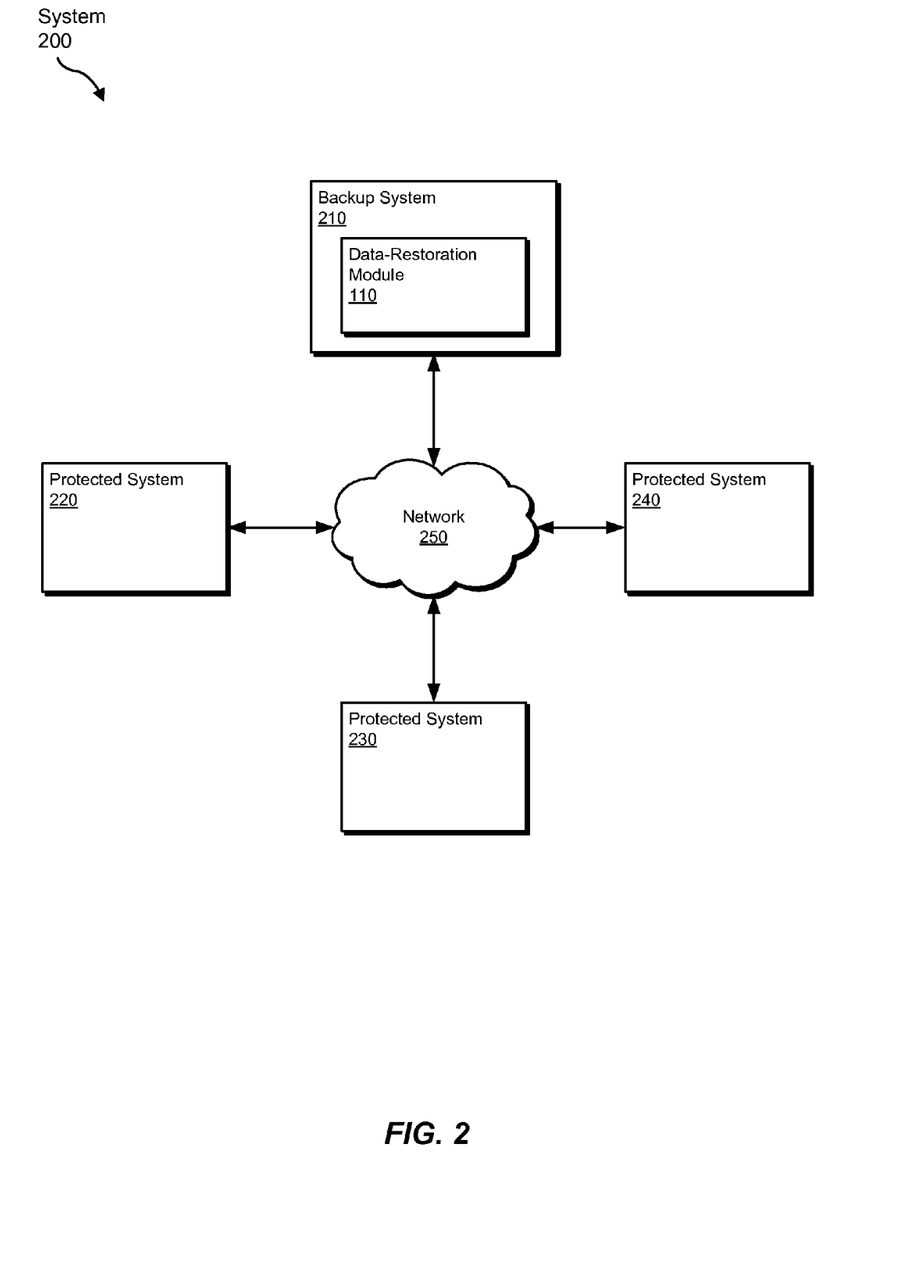
FIG. 2 is a block diagram of another exemplary system for restoring data according to certain embodiments.
Figure 3:
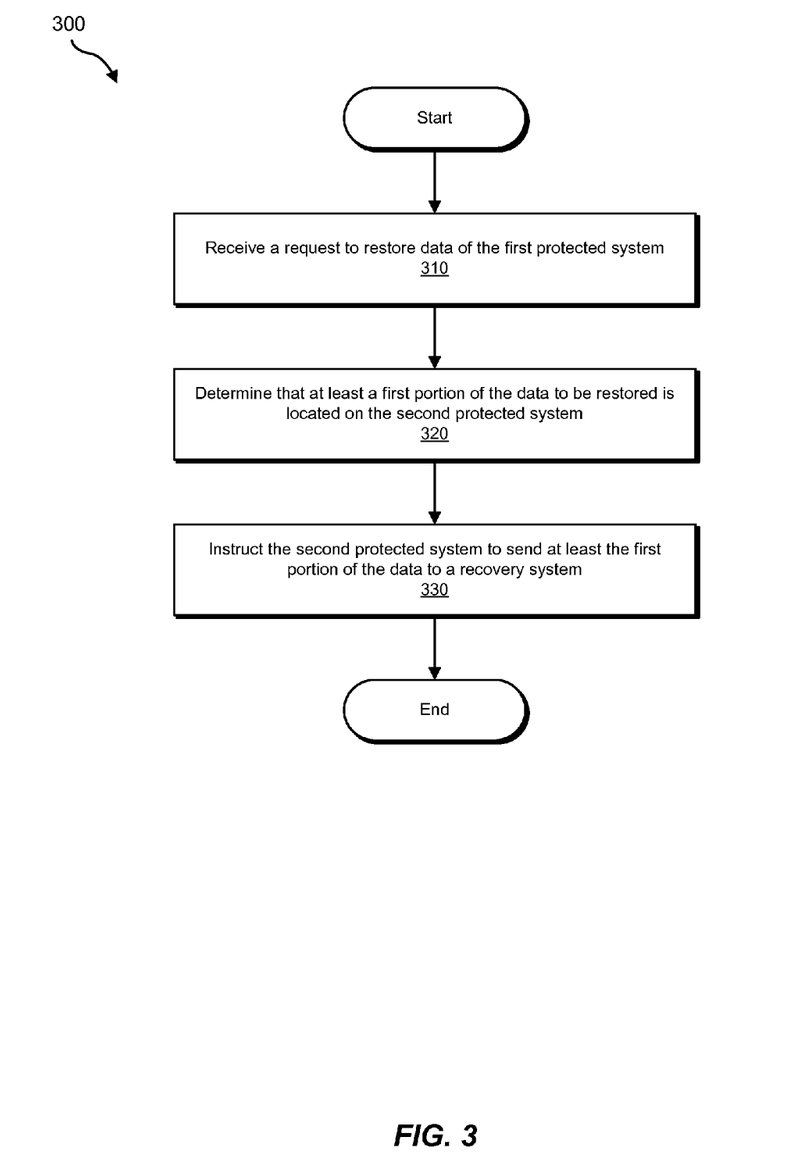
FIG. 3 is a flow diagram of an exemplary method for restoring data according to certain embodiments.
Figure 4:
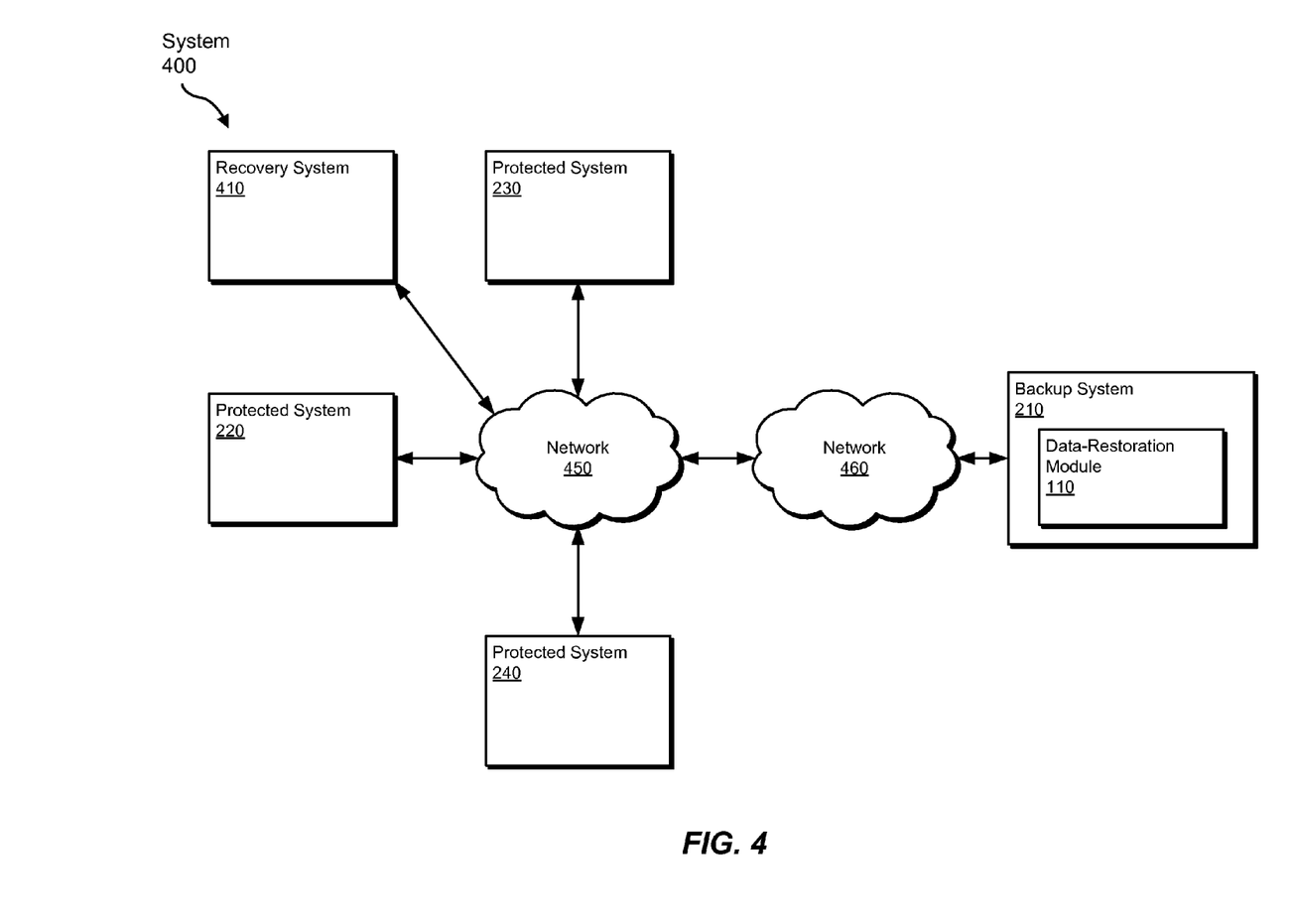
FIG. 4 is a block diagram of an exemplary system for restoring data according to certain embodiments.
Figure 5:
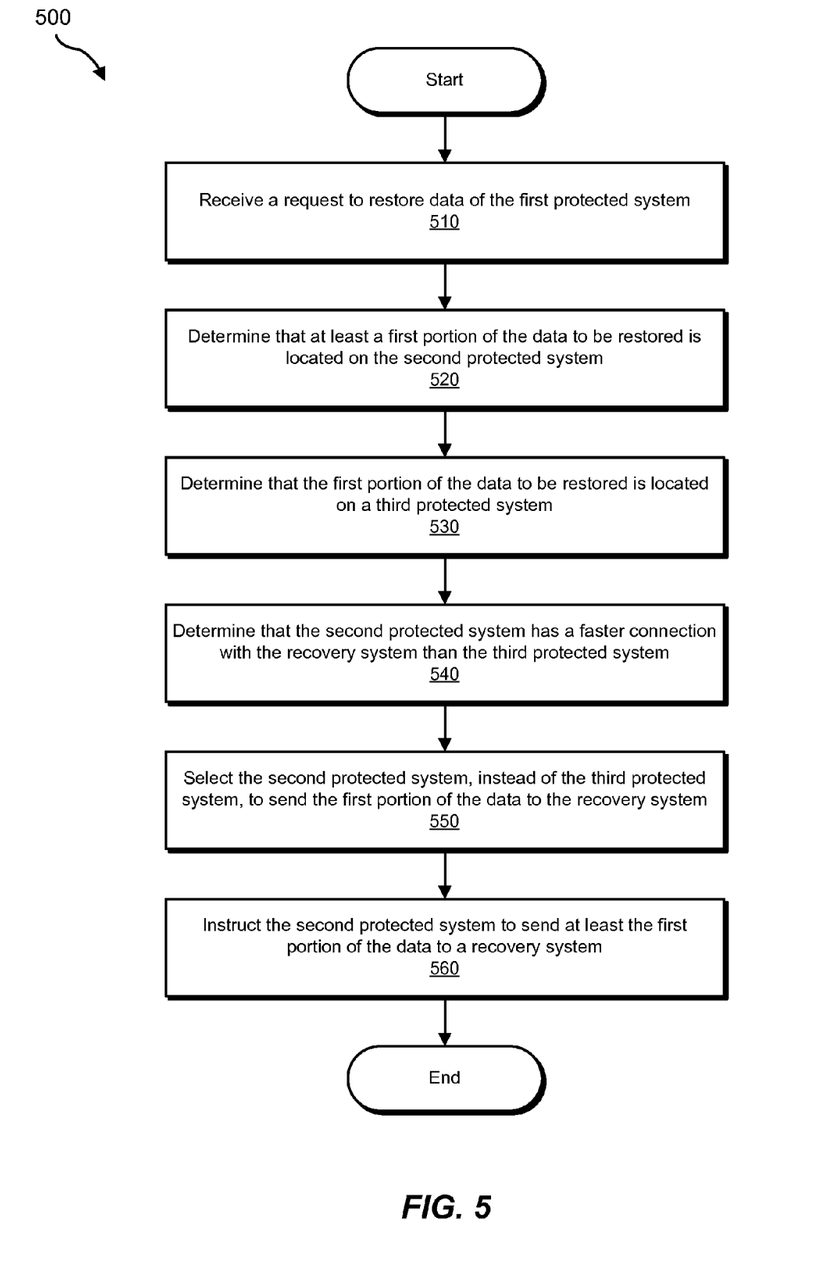
FIG. 5 is a flow diagram of an exemplary method for restoring data according to certain embodiments.
Figure 6:
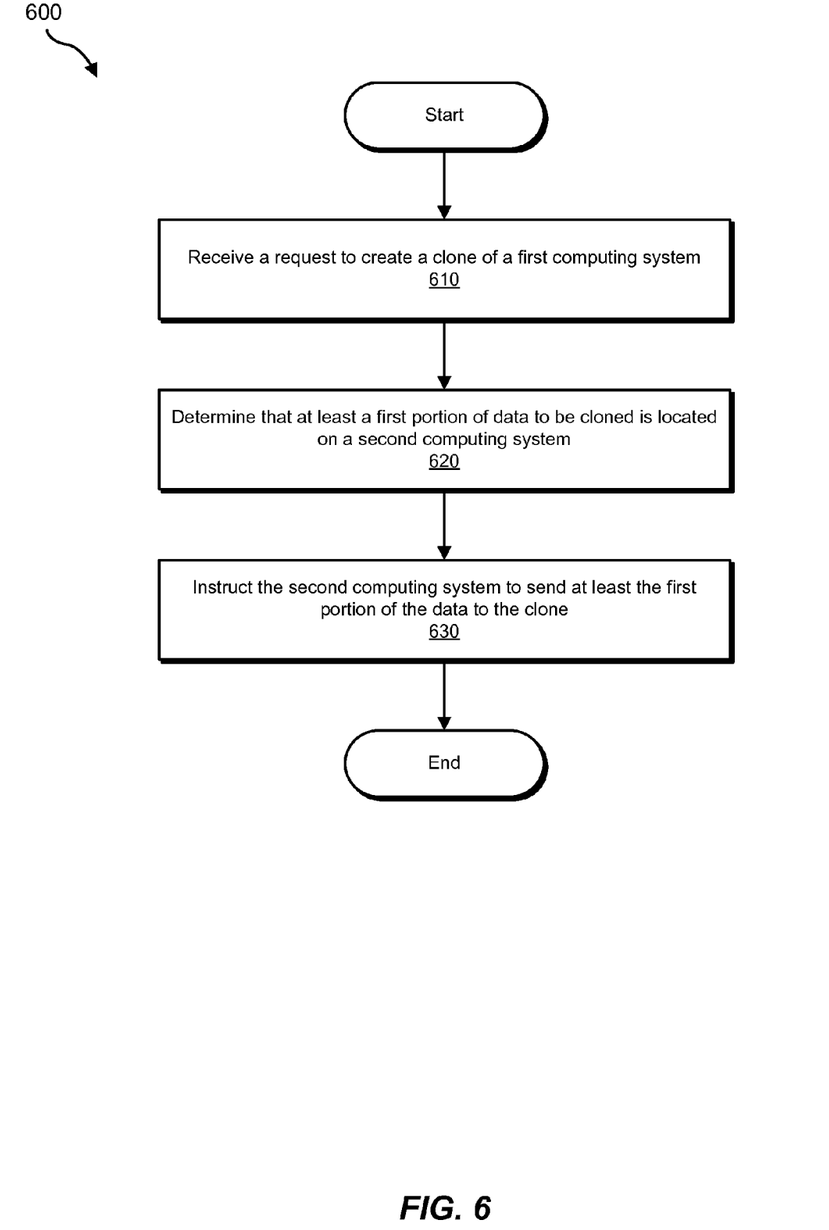
FIG. 6 is a flow diagram of an exemplary method for cloning data according to certain embodiments.
Figure 7:
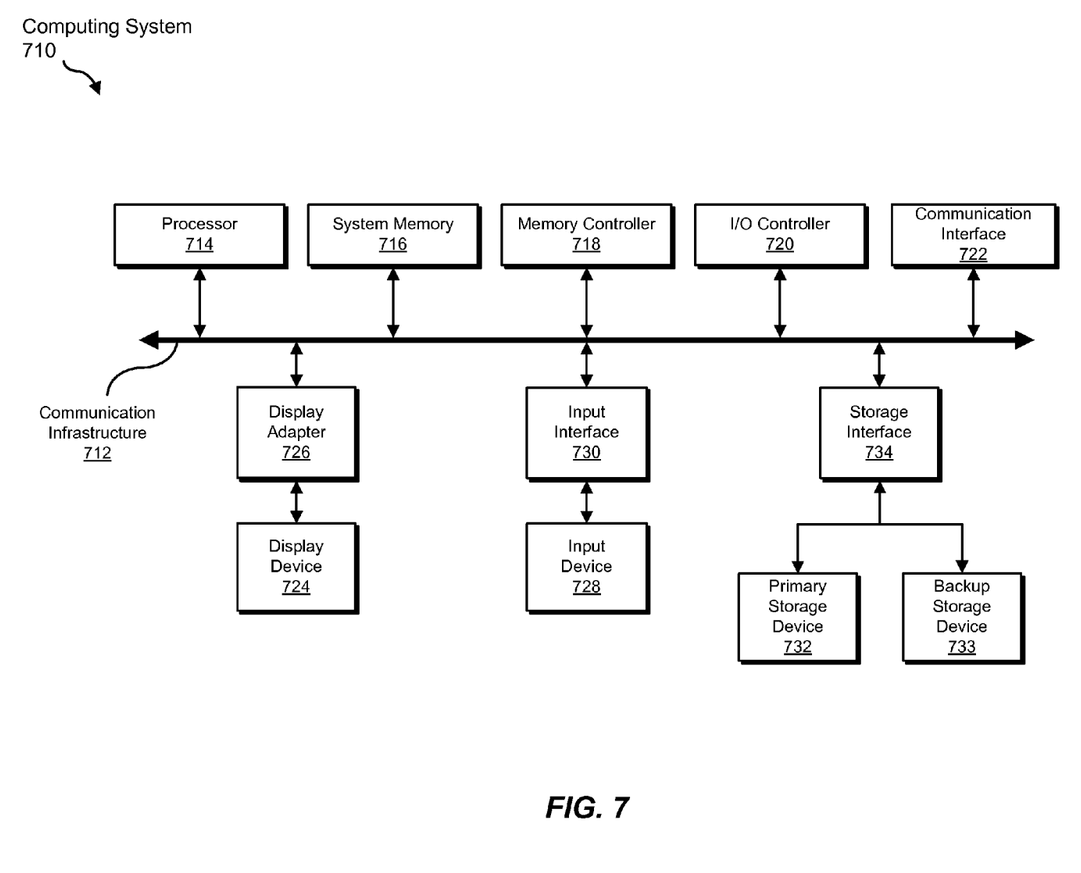
FIG. 7 is a block diagram of an exemplary computing system capable of implementing one or more of the embodiments described and/or illustrated herein.
Figure 8:
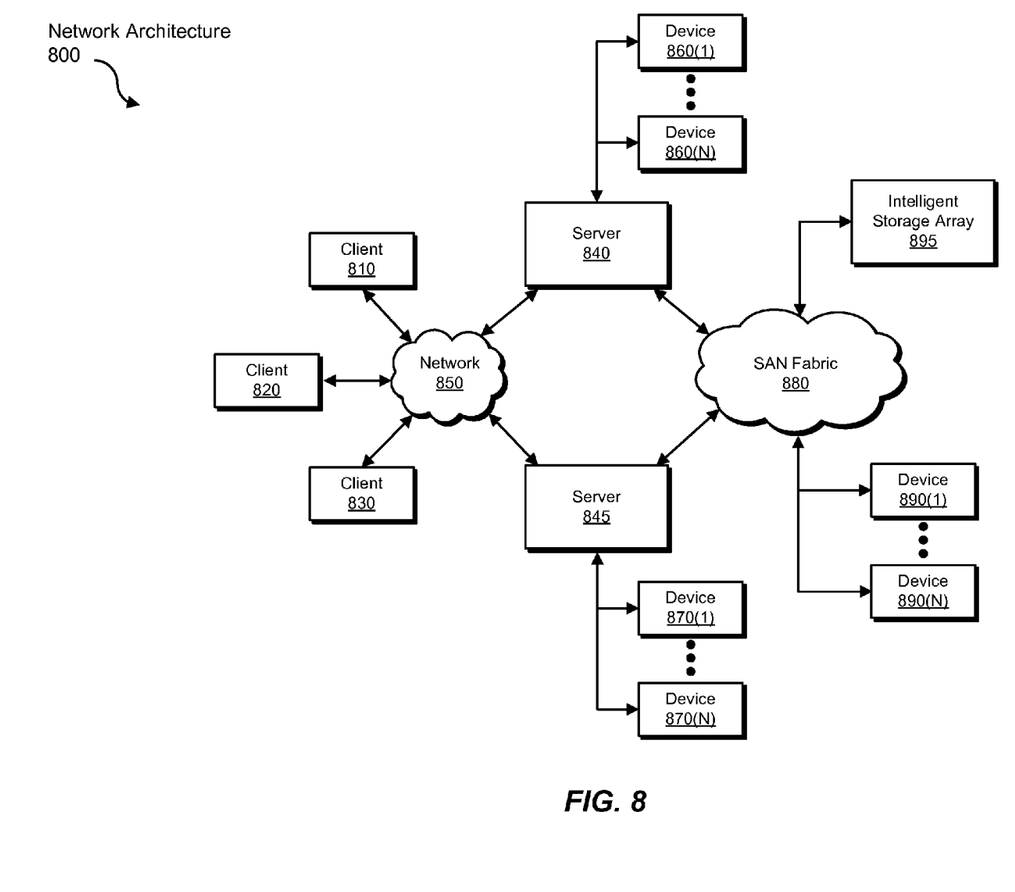
FIG. 8 is a block diagram of an exemplary computing network capable of implementing one or more of the embodiments described and/or illustrated herein.

Embodiments of the instant disclosure provide various methods and systems for utilizing redundant data. In some embodiments, data of a protected system may be restored from one or more other protected systems. A backup system that backs up data on the protected system may coordinate restoration of data among one or more other protected systems. In some embodiments, a system may be cloned by utilizing redundant data from other systems. FIGS. 1, 2, and 4 show exemplary systems for restoring data, and FIGS. 3 and 5 show methods for accomplishing the same. FIG. 6 shows an exemplary system for cloning data. FIGS. 7 and 8 illustrate an exemplary network and computing system for implementing embodiments of the instant disclosure.

FIG. 1 illustrates an exemplary backup system 100. System 100 may include a data-restoration module 110, a storage device 120, backup information 130, and a processor 140. Data-restoration module 110 may be programmed to receive a request to restore data of a first protected system, determine that at least a portion of the data to be restored is located on a second protected system, and instruct the second protected system to send at least the first portion of the data to a recovery system.

Data-restoration module 110 may represent a software module configured to run on one or more computing devices, such as computing system 710 in FIG. 7 and/or portions of exemplary network architecture 800 in FIG. 8. Data-restoration module 110 may also represent all or portions of one or more special-purpose computers configured to perform one or more of the tasks associated with steps disclosed herein.

Storage device 120 may store backup data from one or more protected systems. Storage device 120 may represent a portion of one or more computing devices. For example, storage device 120 may represent a portion of computing system 710 in FIG. 7 and/or portions of exemplary network architecture 800 in FIG. 8. In some embodiments, storage device 120 may be implemented in a cloud computing environment. Data may be stored in storage device 120 using any suitable data structure or data storage mechanism.

Backup information 130 may contain information associated with backup data from one or more protected systems. For example, backup information 130 may include any type of bookkeeping information for tracking data units. As used herein, the phrases "data unit" and/or "portion of data" may refer to a data segment (e.g., a file segment), a data block, a data sector, a data cluster, and/or any other unit of data.

As noted, system 100 may include processor 140. Processor 140 may include any suitable microprocessor and/or central processing unit ("CPU") configured to execute data-restoration module 110. In some embodiments, multiple processors may be configured to execute data-restoration module 110.

FIG. 2 illustrates a system 200 that provides an exemplary configuration of components of system 100. System 200 may include a backup system 210, a protected system 220, a protected system 230, a protected system 240, and a network 250. As used herein, the phrase "protected system" generally refers to any computing system and/or device for which data is backed up on a backup system. As shown, backup system 210 may include data-restoration module 110. In some embodiments, backup system 210 may also include storage device 120. Backup system 210 may backup data from protected system 220, protected system 230, and/or protected system 240.

Backup system 210 may implement one or more backup technologies to protect data. In some embodiments, backup system 210 may implement deduplication to store data more efficiently and effectively. Backup system 210 may use data deduplication to reduce the amount of storage space used in a single-instance data-storage system by detecting and preventing redundant copies of data from being stored to the single-instance data-storage system. For example, data deduplication is often used to reduce the amount of storage space needed to maintain backups of an organization's data.

In order to perform data deduplication, backup system 210 may need to be able to identify redundant copies of the same data from one or more protected systems. Because of the processing requirements involved in comparing each incoming unit of data with each unit of data that is already stored in a single-instance data-storage system, the detection may be performed by the backup system by comparing smaller data signatures ("fingerprints") of each data unit instead of comparing the data units themselves. The detection generally involves generation of a new fingerprint for each unit of data to be stored to the single-instance data-storage system and comparison of the new fingerprint to existing fingerprints of data units already stored by the single-instance data-storage system. If the new fingerprint matches an existing fingerprint, a copy of the unit of data is likely already stored in the single-instance data-storage system.

Fingerprint data may include one or more fingerprints associated with one or more data units and may be stored in backup system 210. Each fingerprint may comprise a signature or other identifier corresponding to and useful for identifying a particular data unit stored on backup system 210. Backup system 210 may generate and add the fingerprints to backup information 130 in conjunction with storage of corresponding data units to backup system 210. The fingerprints and/or other information about backed-up data may be stored in backup information 130 and, as discussed below, may be used during data recovery to determine which protected system or systems may have a particular data unit.

Backup system 210, protected system 220, protected system 230, and/or protected system 240 may generally represent any type or form of one or more computing devices capable of reading computer-executable instructions. Examples of such computing devices include, without limitation, laptops, desktops, servers, cellular phones, personal digital assistants ("PDAs"), multimedia players, embedded systems, combinations of one or more of the same, exemplary computing system 710 in FIG. 7, or any other suitable computing device. In some embodiments, backup system 210 may represent a backup environment. A backup environment may include one or more disk- and/or tape-based backup servers.

Backup system 210, protected system 220, protected system 230, and protected system 240 may communicate over a network 250. Network 250 generally represents any medium or architecture capable of facilitating communication or data transfer. Network 250 may include, without limitation, an intranet, a wide area network ("WAN"), a local area network ("LAN"), a personal area network ("PAN"), the Internet, Power Line communications ("PLC"), a cellular network (e.g., a GSM network), or the like. Network 250 may facilitate communication or data transfer using wireless and/or wired communications.

FIG. 3 illustrates an exemplary method for restoring data. The steps in FIG. 3 may be performed by one or more of the components of systems 100 and 200. For example, at step 310 data-restoration module 110 may receive a request to restore data of protected system 220. Data-restoration module 110 may receive the request to restore data after protected system 220 fails, after data on protected system 220 becomes corrupted, and/or after any other data loss on protected system 220. Data-restoration module 110 may receive the request to restore data from protected system 220, from another system being used to recover the data of protected system 220, from a remote device (e.g., an administrator's computer), and/or from any other source. In some embodiments, the request to restore data may be a request to restore all the data backed up from protected system 220. In other embodiments, the request may be to restore any portion of data backed up from protected system 220.

At step 320, data-restoration module 110 may determine that at least a first portion of the data to be restored is located on a protected system. For example, data-restoration module 110 may determine that a portion of data to be restored to protected system 220 is located on protected system 230. Data-restoration module 110 may use any suitable process to determine that at least a first portion of the data to be restored is located on protected system 230. For example, data-restoration module 110 may determine that at least a first portion of the data to be restored is located on protected system 230 by searching backup information 130 for a fingerprint (or other data identification information) that indicates the first portion of data is located on protected system 230.

In some embodiments, data-restoration module 110 may identify or create a fingerprint for the portion of data to be restored to protected system 220 and may compare the fingerprint against a list of fingerprints associated with data stored on protected system 230. Data-restoration module 110 may determine that protected system 230 includes the first portion of data to be restored by matching the fingerprint of the data to be restored to a fingerprint in the list associated with data stored on protected system 230.

In some embodiments, the fingerprint data and/or other data identification information may be stored on backup system 210. Additionally or alternatively, the fingerprint data and/or other data identification information may be stored in protected system 230. In such embodiments, backup system 210 may query protected system 230 to determine whether protected system 230 includes the portion of data to be backed up. As previously noted, the data identification information may be information maintained by backup system 210 and/or protected system 230 as part of a data deduplication process and/or any other backup process.

In some embodiments, data-restoration module 110 may determine whether one or more backup systems include one or more portions of the data to be backed up to protected system 220. For example, data-restoration module 110 may determine that protected system 230 and protected system 240 each include multiple portions of data to be restored to protected system 220. Data-restoration module 110 may also identify one or more portions of the data to be restored on any number of additional protected systems. By identifying one or more systems that include one or more portions of the data to be restored to protected system 220, data-restoration module 110 may be able to distribute the workload of data restoration to restore data more quickly and/or more efficiently.

After determining that the at least a first portion of the data to be restored is located on the second protected system, at step 330 data-restoration module 110 may instruct the second protected system to send at least a first portion of the data to a recovery system. For example, data-restoration module 110 may instruct protected system 230 to send a portion of the protected data to protected system 220. Protected system 230 may transfer the data to protected system 220 over network 250. Similarly, data-restoration module 110 may instruct protected system 240 and/or one or more other protected systems to send one or more portions of data to protected system 220.

As an example of the process described in FIG. 3, data-restoration module 110 may use information embedded in bookkeeping information (e.g., fingerprint data) as an index to determine which other protected systems are likely to be holding the same data units as the ones to be restored. Data-restoration module 110 may request that these protected systems check if they still have the data units identified in the bookkeeping information, and if so, may request that the protected systems send the data units to protected system 220. Backup system 210 may source one or more data units if one or more data units are not located on a protected system, In certain embodiments, the portions of the data may include file segments. In such embodiments, data-restoration module 110 may work together with protected system 220 to reconstruct one or more files from one or more file segments received from one or more other protected systems. In other embodiments, protected system 220 may receive reconstructed files and/or other data units from one or more other protected systems and/or backup system 210.

Data-restoration module 110 may, after instructing the second protected system to send data to the recovery system, verify that the data was received by the recovery system. In some embodiments, data-restoration module 110 may verify that the recovery system has received a complete restore of all lost data.

In some embodiments, backup system 210 may deduplicate data stored for first and second protected systems, and the first and second protected systems may be referred to as deduplication clients. In such embodiments, the backup computing system may be referred to as a deduplication server.

FIG. 4 shows an exemplary system 400 with backup system 210 being remote from protected systems 220, 230, and 240. For example, network 450 may represent a Local Area Network ("LAN") of an enterprise. Network 460 may represent a Wide Area Network ("WAN"). As previously noted, common backup practice may recommend remote storage of a backup system from a protected network. In such backup configurations, protected systems may have faster connections with one another than with a backup system.

FIG. 4 shows a recovery system 410. In some embodiments, data may be recovered to a system other than the system that failed. For example, if protected system 220 fails, data may be restored to recovery system 410. Restoring data to a different system than the backed-up system may be useful if the backed-up system cannot be rehabilitated in a timely manner. Recovery system 410 may represent a new system added to an enterprise network to replace a failed system and/or a system already present on the enterprise network.

FIG. 5 shows a method for at least partially optimizing a restoration process. The steps shown in FIG. 5 may be performed by one or more of the components of system 400 and provide an example of restoring data lost by a protected system to a different recovery system. At step 510, data-restoration module 110 may receive a request to restore data of a first protected system, such as protected system 220, to a recovery system, such as recovery system 410. At step 520, data-restoration module 110 may determine that at least a first portion of the data to be restored is located on protected system 230. Steps 510 and 520 are similar to steps 310 and 320 of FIG. 3. Therefore, the discussion of steps 310 and 320 may also apply to steps 510 and 520.

At step 530, data-restoration module 110 may determine that the first portion of the data to be restored is located on a third protected system, such as protected system 240. At step 540, data-restoration module 110 may determine that protected system 230 has a faster connection with recovery system 410 than protected system 240.

Data-restoration module 110 may determine that protected system 230 has a faster connection than protected system 240 in any suitable manner. For example, data-restoration module 110 may determine that protected system 230 has a faster connection than protected system 240 by determining that protected system 230 is located in closer proximity to recovery system 410 than protected system 240. Additionally or alternatively, data-restoration module 110 may determine that protected system 230 has a faster connection than protected system 240 by determining that protected system 230 has a faster network interface than protected system 240. Data-restoration module 110 may identify connection-speed information by querying a database that stores connection-speed information, by performing a connection-speed test, and/or in any other suitable manner.

At step 550, data-restoration module 110 may select the second protected system (e.g., protected system 230), instead of the third protected system (e.g., protected system 240), to send the first portion of the data to the recovery system. Since protected system 230 has a faster connection with recovery system 410 than does protected system 240, restoring data from protected system 230 may be faster than restoring data from protected system 240. At step 560, data-restoration module 110 may instruct the second protected system (e.g., protected system 230) to send at least the first portion of the data to the recovery system (e.g., recovery system 410).

If one or more portions of data to be restored are located on more than two protected devices, data-restoration module 110 may determine which of all the devices has the fastest connection with recovery system 410. Data-restoration module 110 may use the protected device with the fastest connection to restore data to recovery system 410. In some embodiments, data-restoration module 110 may determine that a protected system with data to be restored may have a slower connection with recovery system 410 than backup system 210. In such embodiments, data-restoration module 110 may instruct backup system 210, rather than the protected system, to provide the data to be restored to recovery system 410. Data-restoration module 110 may also implement any other suitable algorithm or heuristic to select a protected system for restoring data to a recovery system. By evaluating connection-speed information and/or other network bandwidth information, data-restoration module 110 may be able to prioritize which protected systems to use for restoring data, which may maximize (or at least partially maximize) network bandwidth use. In various embodiments, data-restoration module 110 may transform a recovery system into a recovered system by restoring data to the recovery system.

The principles described herein may also apply to methods and systems for cloning a computing system. FIG. 6 shows an example of a process of utilizing redundant data on one or more other computing systems when cloning a computing system. For example, at step 610 a cloning module may receive a request to create a clone of a first computing system. As used herein, the term "clone" generally refers to a computing system created by copying data from another computing system.

At step 620, a cloning module may determine that at least a first portion of data to be cloned is located on a second computing system, and at step 620 the cloning module may instruct the second protected system to send at least the first portion of the data to the clone. Steps 610, 620, and 630 are similar to steps 310, 320, and 330. Thus, the discussion of steps 310, 320, and 330 may apply to steps 610, 620, and 630. Furthermore, system 100 may be implemented as a system for cloning computing systems in addition to or instead of being implemented as a system for restoring data. In such embodiments, system 100 may include the cloning module.

In some embodiments, the cloning module may determine that one or more portions of the data to be cloned are located on a plurality of computing systems other than the computing system being cloned. The cloning module may instruct each computing system in the plurality of computing systems to send one or more portions of the data to be cloned to the clone. In certain embodiments, one of the computing systems in the plurality of computing systems may include a backup computing system. Thus, the cloning module may create a clone by using backed-up data and/or redundant data on other computing systems to create a clone of a first computing system. By utilizing data on systems other than a system being cloned to create a clone, a cloning module may offload at least some of the input/output and processing load of the system being cloned to other systems.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, instructing, selecting, identifying, querying, sending, and/or verifying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, determining, instructing, selecting, identifying, querying, sending, and/or verifying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for receiving, determining, instructing, selecting, identifying, querying, sending, and/or verifying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 602.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, instructing, selecting, identifying, querying, sending, and/or verifying steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, instructing, selecting, identifying, querying, sending, and/or verifying steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the receiving, determining, instructing, selecting, identifying, querying, sending, and/or verifying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, instructing, selecting, identifying, querying, sending, and/or verifying steps disclosed herein. Network architecture 800 may also be used to perform and/or be a means for performing other steps and features set forth in the instant disclosure.

As detailed above, computing system 710 and/or one or more of components of network architecture 800 may perform and/or be a means of performing, either alone or in combination with other elements, one or more steps of the exemplary methods described and/or illustrated herein. For example, a computing system (e.g., computing system 710 and/or one or more of the components of network architecture 800) may perform a computer-implemented method for restoring data. For example, the computing system may be configured to backup data from first and second protected systems. The computing system may receive a request to restore data of the first protected system. The computing system may also determine that at least a first portion of the data to be restored is located on the second protected system. The computing system may further instruct the second protected system to send at least the first portion of the data to a recovery system.

In certain embodiments, the recovery system may comprise the first protected system. In some embodiments, the first portion of the data is located on both the computing system and the second protected system. In other embodiments, the computing system may determine that one or more portions of the data to be restored are located on a plurality of protected systems. The computing system may determine that one or more portions of the data to be restored are located on the plurality of protected systems by determining that at least the first portion of the data is located on the second protected system. The computing system may back up each protected system in the plurality of protected systems. The computing system may also instruct each protected system in the plurality of protected systems to send one or more portions of the data to be restored to the recovery system.

In various embodiments, the computing system may determine that the first portion of the data to be restored is located on a third protected system. The computing system may determine that the second protected system has a faster connection with the recovery system than the third protected system. The plurality of protected systems may comprise the second and third protected systems. The computing system may also select the second protected system, instead of the third protected system, to send the first portion of the data to the recovery system.

In some embodiments, the computing system may communicate with the recovery system through a wide area network, and the second protected system may communicate with the recovery system through a local area network. In other embodiments, the computing system may determine that at least the first portion of the data to be restored is located on the second protected system by identifying the first portion of the data on a list that identifies data units located on the second protected system and/or by querying the second protected system to verify that the second protected system comprises the first portion of the data.

In certain embodiments, the computing system may deduplicate data stored on the first and second protected systems. The first and second protected systems may include deduplication clients. The computing system may include a deduplication server. The list may be maintained to identify deduplicated data on the second protected system. In various embodiments, the computing system may determine that at least the first portion of the data is located on the second protected system by determining that a data segment to be restored to the first protected system is located on the second protected system. In some embodiments, the computing system may send a second portion of the data to be restored from the computing system to the recovery system. In other embodiments, the computing system may verify that the first portion of the data to be restored was received by the recovery system.

In various embodiments, the computing system may include at least one storage device that may be configured to store backup data from first and second protected systems. The computing system may also include a data-restoration module. The data-restoration module may receive a request to restore data of the first protected system. The data-restoration module may also determine that at least a first portion of the data to be restored is located on a second protected system. The data-restoration module may further instruct the second protected system to send at least the first portion of the data to a recovery system. The computing system may include at least one processor configured to execute the data-restoration module.

In some embodiments, the first portion of the data may be located on the at least one storage device and the second protected system. In other embodiments, the data-restoration module may determine that one or more portions of the data to be restored are located on a plurality of protected systems. The data-restoration module may instruct each protected system in the plurality of protected systems to send one or more portions of the data to be restored to the recovery system.

In various embodiments, the data-restoration module may determine that the first portion of the data to be restored is located on a third protected system. The data-restoration module may also determine that the second protected system has a faster connection with the recovery system than the third protected system. The plurality of protected systems may comprise the second and third protected systems. The data-recovery module may select the second protected system, instead of the third protected system, to send the first portion of the data to the recovery system. In at least one embodiment, the first portion of the data comprises a file segment. In some embodiments, the data-restoration module may send a second portion of the data to be restored from the at least one storage device to the recovery system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method, at least a portion of the method being performed by a single-instance storage system comprising at least one processor and configured to backup data from first and second protected systems, the method comprising:
   receiving a request to restore data of the first protected system;
   identifying a list that is maintained by the single-instance storage system to track deduplicated data that is from the first and second protected systems and stored in the single-instance storage system, wherein the list comprises bookkeeping information for the single-instance storage system;
   using the list to determine that at least a first portion of the data to be restored is located on the second protected system;
   determining that the second protected system has a faster connection with a separate recovery system than the single-instance storage system;
   selecting the second protected system based on the determining of the faster connection, instead of the single-instance storage system, to send the first portion of the data to the recovery system;
   instructing the second protected system to send at least the first portion of the data to the recovery system.

2. The method of claim 1, wherein the list comprises a fingerprint of each data unit stored on the single-instance storage system.

3. The method of claim 1, wherein the first portion of the data is located on both the single-instance storage system and the second protected system.

4. The method of claim 1, wherein:
   the list is stored on the second protected system;
   identifying the list comprises querying the second protected system to determine whether the second protected system comprises the first portion of the data.

5. The method of claim 1, wherein the single-instance storage system maintains the list as part of a deduplication process for deduplicating data received from the first and second protected systems.

6. The method of claim 1, wherein:
the single-instance storage system communicates with the recovery system through a wide area network;
the second protected system communicates with the recovery system through a local area network.

7. The method of claim 1, wherein using the list to determined that at least the first portion of the data to be restored is located on the second protected system comprises:
identifying the first portion of the data on the list;
after identifying the first portion of data on the list, querying the second protected system to verify that the second protected system comprises the first portion of the data.

8. The method of claim 7, wherein:
the first and second protected systems comprise deduplication clients of the single-instance storage system.

9. The method of claim 1, wherein determining that the second protected system has a faster connection with the separate recovery system than the single-instance storage system comprises one of:
determining that the second protected system is located in closer proximity to the recovery system than the third protected system,
determining that the second protected system has a faster network interface than the third protected system, or
performing a connection-speed test.

10. The method of claim 1, further comprising sending a second portion of the data to be restored from the single-instance storage system to the recovery system.

11. The method of claim 1, further comprising verifying that the first portion of the data to be restored was sent from the second protected system and received by the recovery system.

12. The method of claim 1, further comprising:
using the list to determine that a second portion of the data to be restored is located on a third protected system, wherein:
the single-instance storage system is configured to backup data from the third protected system;
the first portion of the data comprises a first segment of a file and the second portion of the data comprises a second segment of the file;
determining that the third protected system has a faster connection with the recovery system than the single-instance storage system;
selecting the third protected system based on the determining of the faster connection, instead of the single-instance storage system, to send the second portion of the data to the recovery system;
instructing the third protected system to send at least the second portion of the data to the recovery system;
after receiving the first and second segments of the file on the recovery system, using the first and second segments of the file to reconstruct the file on the recovery system.

13. A system comprising:
at least one single-instance storage device configured to store backup data from first, second, and third protected systems;
a data-restoration module programmed to:
receive a request to restore data of the first protected system;
identify a list that is maintained by the single-instance storage device to track deduplicated data that is from the first, second, and third protected systems and stored in the single-instance storage device, wherein the list comprises bookkeeping information for the single-instance storage device;
use the list to determine that at least a first portion of the data to be restored is located on the second protected system;
use the list to determine that at least the first portion of the data to be restored is located on the third protected system;
determine that the second protected system has a faster connection with a recovery system than the third protected system;
select the second protected system, instead of the third protected system, to send the first portion of the data to the recovery system based on the determining of the faster connection;
instruct the second protected system to send at least the first portion of the data to the recovery system;
at least one processor configured to execute the data-restoration module.

14. The system of claim 13, wherein the first portion of the data is located on the at least one single-instance storage device and the second protected system.

15. The system of claim 13, wherein determining that the second protected system has a faster connection with the recovery system than the third protected system comprises determining that the second protected system is located in closer proximity to the recovery system than the third protected system.

16. The system of claim 13, wherein determining that the second protected system has a faster connection with the recovery system than the third protected system comprises determining that the second protected system has a faster network interface than the third protected system.

17. The system of claim 13, wherein determining that the second protected system has a faster connection with the recovery system than the third protected system comprises performing a connection-speed test.

18. A computer-implemented method, at least a portion of the method being performed by a single-instance storage system comprising at least one processor, the method comprising:
receiving a request to create a cloned computing system as a clone of a first computing system;
identifying a list that is maintained by a single-instance storage system to track deduplicated data that is from the first computing system and a second computing system and stored in the single-instance storage system, wherein the list comprises bookkeeping information for the single-instance storage system;
using the list to determine that at least a first portion of data to be cloned is located on the second computing system;
determining that the second computing system has a faster connection with the cloned computing system than the single-instance storage system;
selecting the second computing system based on the determining of the faster connection, instead of the single-instance storage system, to send the first portion of the data to the cloned computing system;
instructing the second computing system to send at least the first portion of the data to the cloned computing system.

19. The method of claim 18, further comprising:
wherein the list further tracks deduplicated data that is from a third computing system;

using the list to determine that at least the first portion of the data to be cloned is located on the third computing system;

determining that the second computing system has a faster connection with the cloned computing system than the third computing system;

selecting the second computing system based on the determining of the faster connection, instead of the third computing system, to send the first portion of the data to the cloned computing system.

20. The method of claim 19, wherein determining that the second computing system has a faster connection with the cloned computing system than the single-instance storage system comprises one of:

determining that the second computing system is located in closer proximity to the cloned computing system than the single-instance storage system, determining that the second computing system has a faster network interface than the single-instance storage system, or performing a connection-speed test; and wherein determining that the second computing system has a faster connection with the cloned computing system than the third computing system comprises one of:

determining that the second computing system is located in closer proximity to the cloned computing system than the third computing system, determining that the second computing system has a faster network interface than the third computing system, or performing a connection-speed test.

* * * * *